(12) United States Patent
Fourney

(10) Patent No.: US 7,971,701 B2
(45) Date of Patent: Jul. 5, 2011

(54) DIAGONAL SORTER

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 309 days.

(21) Appl. No.: 12/405,834

(22) Filed: Mar. 17, 2009

(65) Prior Publication Data

US 2009/0173598 A1  Jul. 9, 2009

Related U.S. Application Data

(63) Continuation-in-part of application No. 12/123,931, filed on May 20, 2008, now Pat. No. 7,506,751, which is a continuation-in-part of application No. 11/627,132, filed on Jan. 25, 2007, now Pat. No. 7,461,739.

(60) Provisional application No. 60/762,227, filed on Jan. 26, 2006.

(51) Int. Cl.
*B65G 47/46* (2006.01)

(52) U.S. Cl. .............. 198/370.09; 198/370.01; 198/617; 198/779

(58) Field of Classification Search ............. 198/370.01, 198/370.09, 371.1, 371.3, 617, 779, 782
See application file for complete search history.

(56) References Cited

U.S. PATENT DOCUMENTS

| | | | |
|---|---|---|---|
| 3,550,756 A * | 12/1970 | Kornylak | ....................... 198/637 |
| 3,608,713 A | 9/1971 | Crosby et al. | |
| 4,039,074 A * | 8/1977 | Maxted | ......................... 198/456 |
| 5,092,447 A * | 3/1992 | Wyman | ......................... 198/374 |
| 5,145,049 A | 9/1992 | McClurkin | |
| 6,044,956 A | 4/2000 | Henson et al. | |
| 6,073,747 A | 6/2000 | Takino et al. | |
| 6,318,544 B1 | 11/2001 | O'Connor et al. | |
| 6,478,138 B1 | 11/2002 | Edwards et al. | |

(Continued)

FOREIGN PATENT DOCUMENTS

JP  03-088617 A  5/1991

OTHER PUBLICATIONS

ISA/EP, PCT/US10/27523, International Search Report and Written Opinion of the International Searching Authority, Jun. 22, 2010, European Patent Office, Rijswijk, NL.

*Primary Examiner* — Douglas A Hess
(74) *Attorney, Agent, or Firm* — James T. Cronvich

(57) ABSTRACT

In one embodiment, a conveyor system includes a conveyor belt having a plurality of conveyor belt rollers configured to divert articles on the conveyor belt, and a drive mechanism that engages the conveyor belt rollers, the drive mechanism being configured to drive the conveyor belt rollers, the drive mechanism being adjustable such that the conveyor belt rollers can be selectively driven in a first angular direction and, optionally, a second, opposite angular direction so that articles can be selectively diverted to either side of the conveyor belt at a desired diverting angle. One version of the drive mechanism has drive rollers mounted in cartridges and rack gears engaging pinion gears on the cartridges to adjust the orientation of the drive rollers relative to the belt rollers to drive them in selectively opposite angular directions. Such a conveyor system with a series of sequential roller actuation zones driven by separately actuated drive mechanisms is arranged diagonally to an infeed conveyor and a multi-lane outbound conveyor to realize a switch conveyor.

14 Claims, 16 Drawing Sheets

U.S. PATENT DOCUMENTS

| | | |
|---|---|---|
| 6,571,937 B1 | 6/2003 | Costanzo et al. |
| 6,923,309 B2 | 8/2005 | Costanzo |
| 6,968,941 B2 | 11/2005 | Fourney |
| 7,007,792 B1 | 3/2006 | Burch |
| 7,040,478 B2 | 5/2006 | Ehlert |
| 7,073,651 B2 * | 7/2006 | Costanzo et al. ....... 193/35 MD |
| 7,191,894 B2 | 3/2007 | Costanzo et al. |
| 7,237,670 B1 | 7/2007 | Ryan |
| 7,249,669 B2 | 7/2007 | Fourney |
| 7,284,653 B2 | 10/2007 | Fourney et al. |
| 7,306,086 B2 * | 12/2007 | Boelaars ................. 193/35 SS |
| 7,311,192 B2 | 12/2007 | Fourney |
| 7,344,018 B2 | 3/2008 | Costanzo et al. |
| 7,360,641 B1 | 4/2008 | Fourney |
| 7,461,739 B2 | 12/2008 | Fourney |
| 7,506,751 B2 | 3/2009 | Fourney |
| 7,533,766 B1 * | 5/2009 | Fourney ................... 198/370.09 |
| 7,537,106 B2 * | 5/2009 | Fourney ........................ 198/779 |
| 7,556,136 B2 * | 7/2009 | Marshall et al. ......... 198/370.09 |
| 7,607,533 B2 * | 10/2009 | Pressler et al. ................ 198/779 |
| 7,731,010 B2 * | 6/2010 | Kissee et al. ............ 198/370.09 |
| 7,784,601 B2 * | 8/2010 | Riddick et al. ........... 198/457.05 |
| 7,878,319 B2 * | 2/2011 | Costanzo et al. ........ 198/457.02 |
| 2003/0221935 A1 | 12/2003 | Barklin et al. |
| 2007/0221472 A1 | 9/2007 | Fourney |
| 2008/0169171 A1 | 7/2008 | Itoh et al. |

* cited by examiner

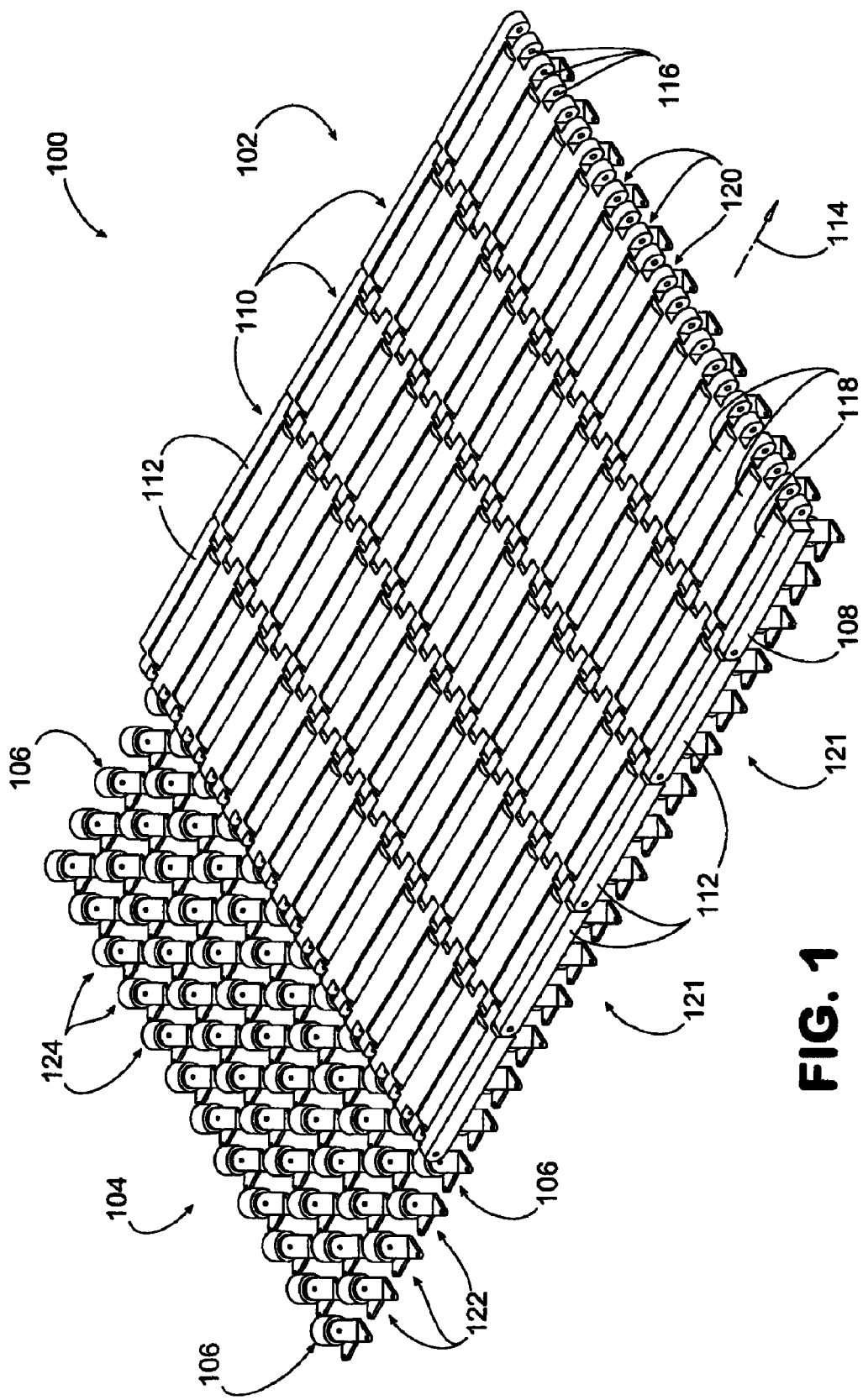

DIAGONAL SORTER

CROSS-REFERENCE TO RELATED APPLICATIONS

This application is a continuation-in-part of co-pending U.S. patent application Ser. No. 12/123,931, "Conveyor Systems for Diverting Objects," filed May 20, 2008, which is a continuation-in-part of U.S. patent application Ser. No. 11/627,132, now U.S. Pat. No. 7,461,739, "Systems and Methods for Diverting Objects," filed Jan. 25, 2007, which claims priority to U.S. Provisional Application Ser. No. 60/762,227, "Systems and Methods for a Variable Angle High-Speed Diverting Conveyor System," filed Jan. 26, 2006, all of which are entirely incorporated herein by reference.

BACKGROUND

The invention relates generally to power-driven conveyors and, more particularly, to a switch conveyor using a diagonally disposed roller-belt sorter to perform the function of a switch.

A sorter is a conveyor that directs individual articles fed into the sorter by an infeed conveyor to selected outbound paths branching off from one or both sides of the sorter. A switch is a conveyor in which articles are conveyed to outbound paths receiving the articles off the end of the switch in the same direction as they are conveyed by the infeed conveyor. Switches with one infeed conveyor and multiple outbound paths are typically realized by a rectangular conveyor receiving a single file of articles at the switch's upstream end and moving individual articles laterally to align them with the designated outbound path. To maintain throughput, the articles continuously advance along the switch as they are being directed laterally. Consequently, the upstream portions of the rectangular switch flanking the exit of the infeed conveyor are unused. The unused portions require the purchase of more square feet of conveyor material and take up valuable floor space. Furthermore, when a belt conveyor with a long pitch requiring large-diameter sprockets is used as the switch conveyor, transfer over the ends of the conveyor belt at the location of the large sprockets is difficult.

SUMMARY

These disadvantages are overcome by a switch embodying features of the invention. One version of such a switch comprises an infeed conveyor conveying articles in a conveying direction and an outbound conveyor having a plurality of outbound conveyor lanes receiving conveying articles and conveying the articles in the conveying direction. A sorting conveyor is disposed on a diagonal oblique to the conveying direction between the infeed conveyor and the outbound conveyor. The sorting conveyor comprises a belt advancing along the diagonal. The belt has rollers that are selectively rotatable transverse to the diagonal toward the outbound conveyor in roller actuation zones, which are sequentially disposed along the length of the sorting conveyor. The belt rollers push the articles received from the infeed conveyor onto the outbound conveyor at a selected position along the sorting conveyor.

Another version of a switch embodying features of the invention comprises an infeed conveyor having an exit end and conveying articles in a conveying direction toward the exit end and a plurality of outbound conveyor lanes having entrance ends and conveying articles in the conveying direction from the entrance ends. A sorting conveyor extends in length diagonally between the exit end of the infeed conveyor and the entrance ends of the outbound conveyor lanes from an upstream end to a downstream end between parallel first and second sides. The infeed conveyor feeds articles to the sorting conveyor over the first side at an upstream position, and the outbound lanes receive articles from the sorting conveyor over the second side at the entrance ends. The sorting conveyor includes a roller belt that advances along the length of the sorting conveyor in a direction of belt travel oblique to the conveying direction. Article-supporting belt rollers in the belt are selectively rotatable on axes parallel to the direction of belt travel. A series of belt-roller actuation zones underlie the roller belt along the length of the sorting conveyor to selectively rotate the belt rollers in each zone toward the second side to push supported articles toward the outbound conveyor lanes. Each actuation zone is preferably associated with a proximate outbound conveyor lane.

Another aspect of the invention provides a method for making a switch. The method comprises: (a) providing a sorting conveyor having a belt with plurality of actuatable article-supporting rollers arranged to be selectively rotated in a direction perpendicular to a direction of belt travel in roller actuation zones sequentially disposed along the length of the sorting conveyor; (b) arranging an infeed conveyor to feed articles onto the sorting conveyor in a conveying direction oblique to the direction of belt travel from a first side of the sorting conveyor; and (c) arranging an outbound conveyor on an opposite second side of the sorting conveyor with a plurality of lanes parallel to the conveying direction, wherein each lane is arranged to receive articles from the sorting conveyor over the second side.

BRIEF DESCRIPTION OF THE DRAWINGS

The disclosed systems and methods can be understood with reference to the following drawings. The components in the drawings are not necessarily to scale.

FIG. 1 is a top perspective view of a first embodiment of a portion of a conveyor system.

DETAILED DESCRIPTION

Figure 2A:
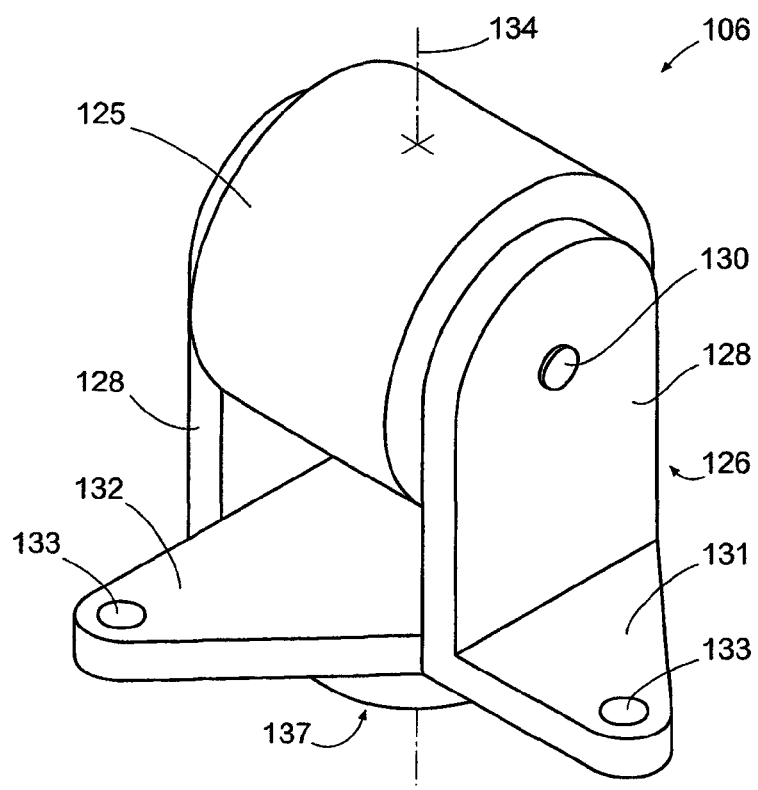
FIG. 2A is a top perspective view of a drive roller module used in the conveyor system of FIG. 1.

In a conventional switch conveyor, an infeed conveyor feeds articles in single file onto the upstream end of a switch that repositions each article laterally in line with a designated outbound lane at its downstream end. A switch conveyor embodying features of the invention uses a roller-belt conveyor having selectively actuated rollers arranged to rotate perpendicular to the direction of belt travel as a switch. The roller-belt conveyor employs a drive mechanism comprising free-spinning angularly adjustable rollers that control rotation of rollers contained within the conveyor belt. In some embodiments, a conveyor belt comprises a plurality of longitudinally oriented free-spinning rollers that are "driven" through contact with free-spinning angularly adjustable rollers that are positioned below the conveyor belt. In such systems, articles can be diverted at various angles to either side of the conveyor belt through mere actuation of the angularly adjustable rollers. Furthermore, when the angularly adjustable rollers are aligned with the direction of belt travel, the conveyor belt rollers can be braked such that they will not rotate, thereby reducing or eliminating article drift. Moreover, given that the angularly adjustable rollers can be gradually rotated from the braking orientation to a desired diverting angle, the conveyor belt rollers can be gradually accelerated, thereby reducing or eliminating slip.

Referring to the figures, in which like numerals indicate corresponding parts throughout the several views, FIG. 1 illustrates an embodiment of a portion of a conveyor system 100 that can be adjusted to divert articles at various angles to either side of the system. As indicated in FIG. 1, the conveyor system 100 comprises a conveyor belt 102 and a field 104 of angularly adjustable "drive" roller modules 106. In the embodiment of FIG. 1, the conveyor belt 102 comprises a conveyor belt frame 108 that is composed of a plurality of transverse modular conveyor belt sections 110. Within each conveyor belt section 110 is a plurality of elongated conveyor belt links 112 that extend in the direction of belt travel 114 and connect to adjacent conveyor belt links of adjacent conveyor belt sections. By way of example, each conveyor belt link 112 comprises a metal or plastic member having an opening 116 provided at each of its opposed ends that receives a rod or shaft (not shown) that passes through the openings of conveyor belt links of adjacent conveyor belt sections 110 so as to connect the conveyor belt sections to each other.

Interposed between the conveyor belt links 112 are elongated longitudinally oriented free-spinning conveyor belt rollers 118. For the purposes of this disclosure, the term "free-spinning" means that the rollers are free to spin about their axes of rotation in either angular direction. Therefore, the rollers 118 may be said to comprise "idler" rollers that will freely rotate in either angular direction when driven by an appropriate force. In the embodiment of FIG. 1, the rollers 118 are positioned such that their axes of rotation are parallel to the direction of belt travel 114. As shown in FIG. 1, the rollers 118 can be alternately provided along the width of each conveyor belt section 110 in relation to the conveyor belt links 112 such that a roller is positioned between each pair of adjacent conveyor belt links. In such an arrangement, the rollers 118 of the various conveyor belt sections 110 can be arranged in columns 120 that extend in the direction of belt travel 114 and rows 121 that extend across the width of the conveyor belt 102. It is noted that, although the rollers 118 have been described and depicted as being elongated, the rollers need not necessarily be elongated in the direction of their axes of rotation.

Figure 7:
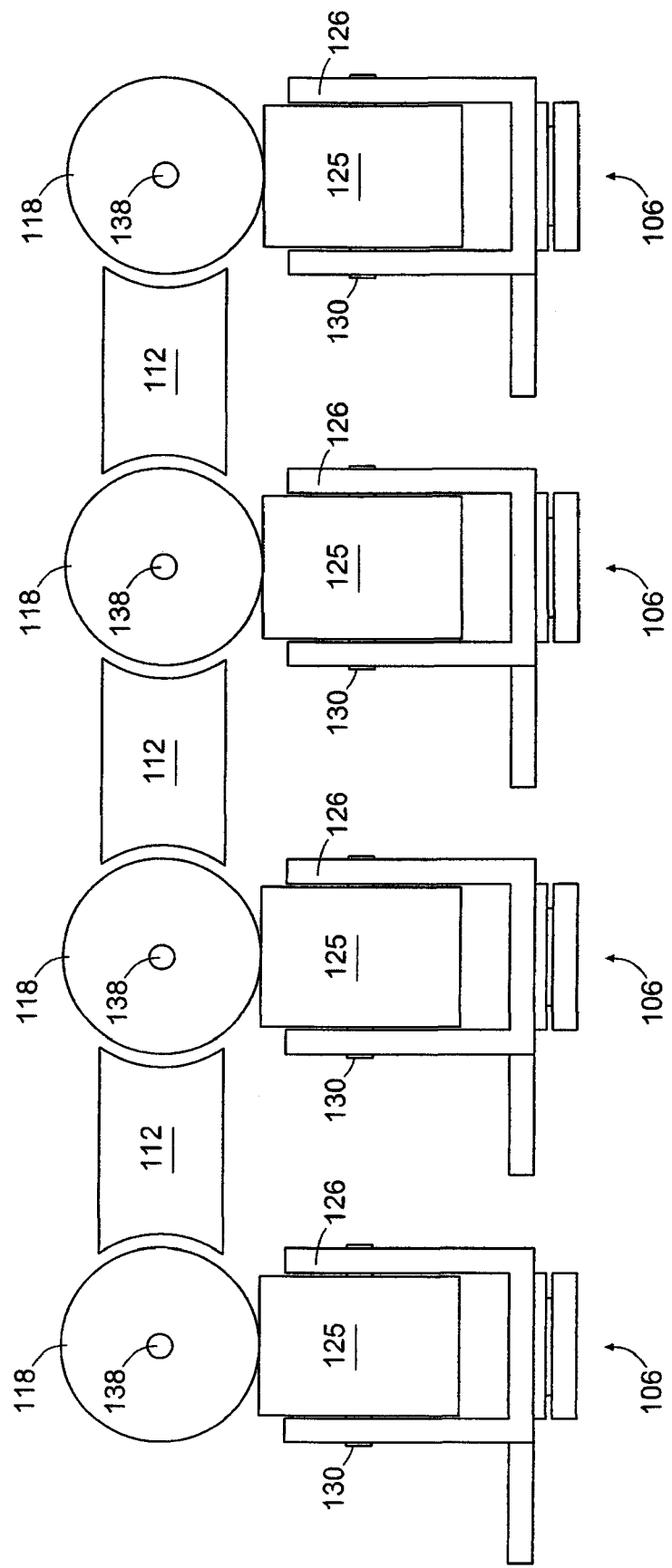
FIG. 7 is an end view of a portion of the conveyor system of FIG. 1, illustrating a braking function provided by angularly adjustable drive rollers of the system.

The conveyor belt rollers 118 are made of metal and/or plastic and are provided with a rubber or plastic high-friction outer layer or coating that prevents slippage when rollers of the roller modules 106 are brought into contact with the conveyor belt rollers. Each roller 118 can connect at each of its ends to the conveyor belt frame 108 and/or to the rods or shafts that connect the various conveyor belt sections 110. As indicated in FIG. 7, the rollers 118 are dimensioned so as to extend beyond the upper and lower surfaces of the conveyor belt frame 108 (and belt links 112) such that they can both divert articles placed on the conveyor belt 102 and can be driven from below by the drive roller modules 106.

With further reference to FIG. 1, the field 104 of angularly adjustable drive roller modules 106 comprises a plurality of rows 122 and columns 124 of drive roller modules. The drive roller modules 106 are positioned such that their columns 124 align with the columns 120 of the conveyor belt rollers 118 and their rows 122, at least intermittently during conveyor system operation, align with rows 121 of conveyor belt rollers. In the first embodiment shown in FIG. 1, the drive roller modules 106 comprise relatively short (in the dimension of their axes of rotation) caster rollers (see FIGS. 2A and 2B) that are positioned closely enough to each other such that at least one drive roller is aligned with any given conveyor belt roller 118 during the operation. Indeed, in the embodiment of FIG. 1, the drive roller modules 106 are positioned closely enough such that at least two drive rollers are positioned adjacent any given conveyor belt roller 118, during conveyor operation.

Figure 2B:
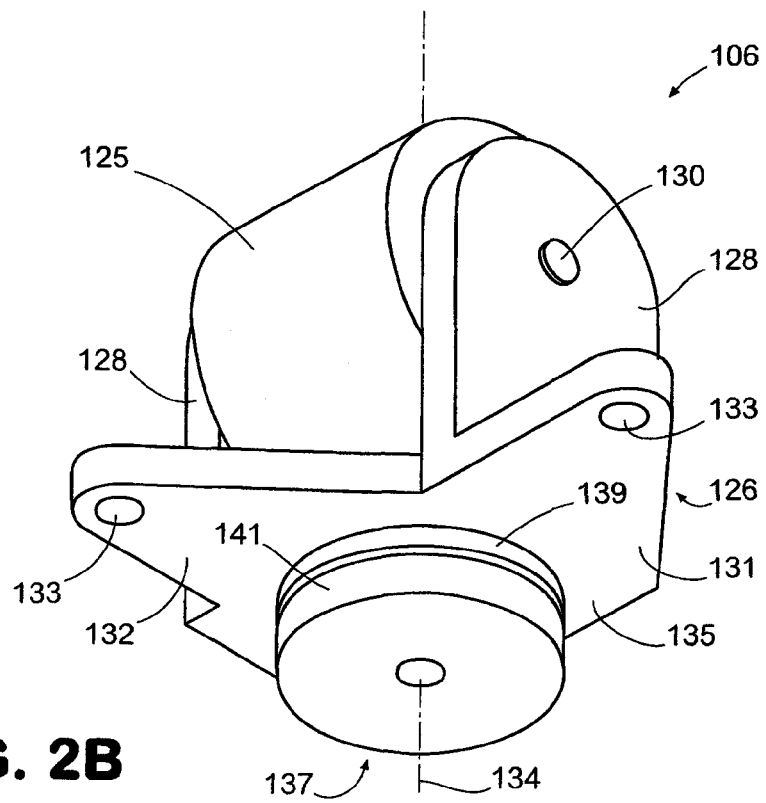
FIG. 2B is a bottom perspective view of a drive roller module used in the conveyor system of FIG. 1.

Turning to FIGS. 2A and 2B, which illustrate perspective views of a single drive roller module 106, each drive roller module includes a free-spinning drive roller 125 that is free to rotate in either angular direction relative to its axis of rotation. Accordingly, although designated as "drive" rollers, the drive rollers 125 are not themselves driven by some mechanical means, such as a motor or the like. By way of example, each drive roller 125 is made of metal and/or plastic and, like the conveyor belt rollers 118, has a rubber or plastic high-friction outer layer or coating.

As shown in FIGS. 2A and 2B, the drive roller 125 is supported within a frame 126 that comprises opposed vertical support members 128. Extending between the support members 128 and through a central opening provided in the drive roller 125 (not shown) is a shaft 130 about which the drive roller can rotate (i.e., the axis of rotation). In addition to the support members 128, the frame 126 comprises first and second control arms 131 and 132 that, as described below, can be used to pivot the drive roller module 106 about a central vertical axis 134 to adjust the angle of the roller 125 relative to the direction of belt travel 114 (FIG. 1). As indicated in FIGS. 2A and 2B, each control arm 131, 132 comprises an opening 133 that enables pivotal connection to an appropriate member that is used to adjust the angular orientation of the drive roller module 106.

As best shown in FIG. 2B, the frame 126 further includes a base 135 and a pivot mechanism 137 that supports the base. In the embodiment of FIG. 2B, the pivot mechanism 137 comprises upper and lower portions 139 and 141 that can rotate in opposite directions relative to each other and thereby enable pivoting of the drive roller module 106. Suitable friction-reducing elements, such as bearings, can be provided between the portions 139 and 141 to facilitate pivoting.

Figure 3:
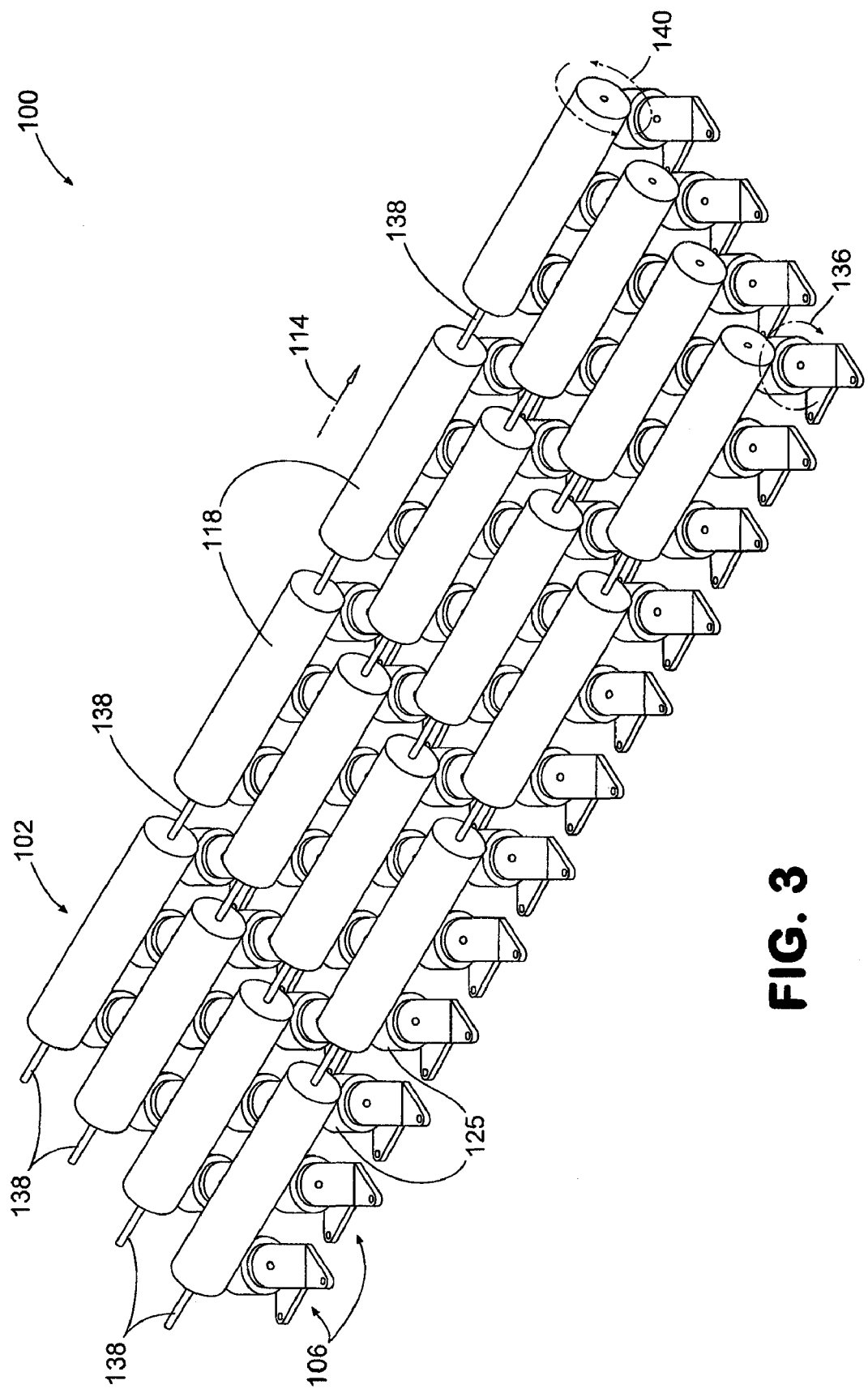
FIG. 3 is top perspective view of a further portion of the conveyor system of FIG. 1.

FIG. 3 illustrates a further portion of the conveyor system 100. More particularly, FIG. 3 illustrates interaction between the drive rollers 125 and the conveyor belt rollers 118. Notably, the conveyor belt frame 108 is not shown in the figure for purposes of clarity in describing other components of the conveyor system 100.

As indicated in FIG. 3, the drive rollers 125 are positioned so as to contact the conveyor belt rollers 118 so that movement of the conveyor belt 120 in the direction of belt travel 114 causes rotation of both the drive rollers and the conveyor belt rollers due to the frictional forces between them. In the orientation shown in FIG. 3, the drive rollers 125 rotate in a downstream direction indicated by arrow 136. As a consequence of that rotation, the conveyor belt rollers 118 are caused to rotate, or are "driven," about their shafts 138 (i.e., axes of rotation) in the direction indicated by arrow 140. Accordingly, in FIG. 3, the conveyor belt rollers 118 rotate counterclockwise (when viewing the conveyor belt 102 from its end looking upstream) and would therefore divert articles supported by the conveyor belt rollers to the left in the orientation of the figure. As is further shown in FIG. 3, each conveyor belt roller 118 is driven in this way by multiple drive rollers 125.

Figure 4:
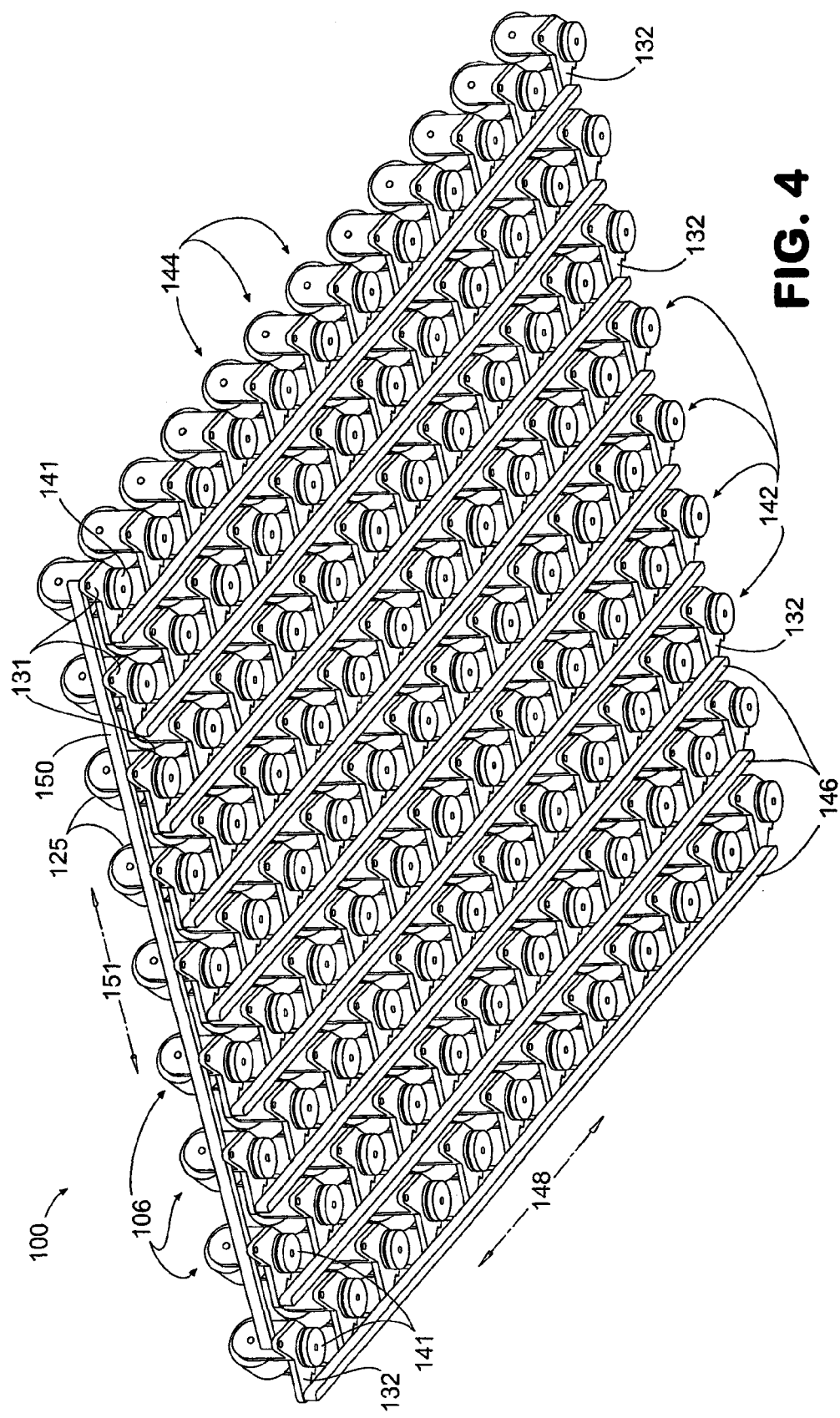
FIG. 4 is a bottom perspective view of a plurality of drive roller modules used in the conveyor system of FIG. 1.

The drive roller modules 106 and, therefore, the drive rollers 125 can be pivoted about their central vertical axes 134 (FIGS. 2A and 2B) to adjust their angulation relative to the direction of belt travel. The drive rollers 125 can be independently actuated or actuated in synchrony in groups. FIG. 4 illustrates a mechanism for enabling the latter actuation scheme (conveyor belt 102 not shown). As indicated in FIG. 4, a plurality of rows 142 and columns 144 of drive roller modules 106 are provided having the general configuration described in relation to FIG. 2. As is further indicated in FIG. 4, the rows 142 of drive roller modules 106 are linked together with linking members 146 that control the angular orientation of the rollers 125. More particularly, control arms 132 of the drive roller modules 106 are pivotally connected to a linking member 146, which can take the form of a rod or shaft. By way of example, that connection is made with pins (not shown) that extend through the openings 133 (FIGS. 2A and 2B) provided in the control arms 132 of the drive roller modules 106 and into aligned openings (not shown) of the linking member 146. When the position of each drive roller module 106 is fixed relative to its central vertical axis 134, for example due to fixation of the lower portion 141 of the pivot mechanism 137 (FIGS. 2A and 2B), transverse displacement of the linking members 146 in the directions indicated by arrow 148 causes the rollers 125 to pivot about the central vertical axes, thereby adjusting their angular orientation.

The linking members 146 can be displaced by any appropriate means. In embodiments in which multiple linking members 146 are to be simultaneously displaced, and therefore multiple rows of rollers 125 are to be simultaneously pivoted, the linking members can be connected to a single actuation member 150 that is positioned adjacent to either side of the conveyor system 100 and pivotally connected to control arms 131 of an adjacent column 144 of drive roller modules 106. In such a case, longitudinal displacement of the actuation member 150 in the directions indicated by arrow 151 will cause pivoting of the adjacent column 144 of drive roller modules 106, which therefore causes the linking members 146 to laterally translate, which, in turn, causes the remaining drive roller modules to pivot.

Figure 5A:
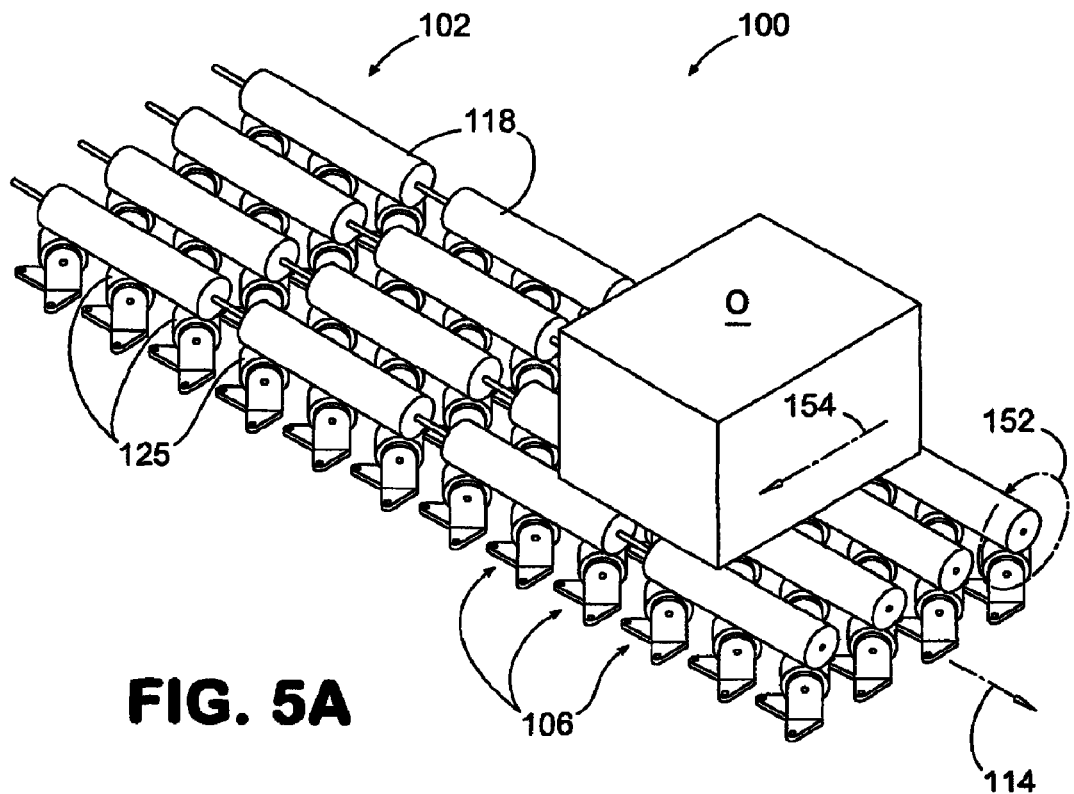
FIG. 5A is a view of the conveyor system portion shown in FIG. 3, illustrating diverting action in a first direction.
Figure 5B:
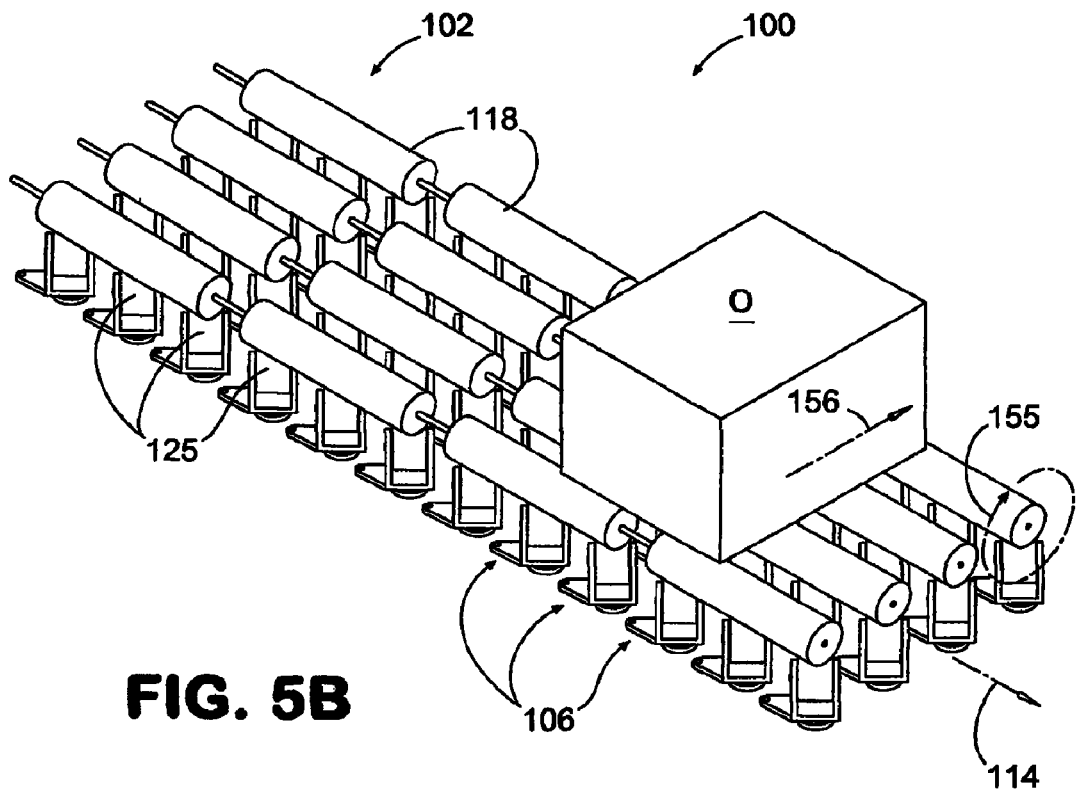
FIG. 5B is a view of the conveyor system portion shown in FIG. 3, illustrating diverting action in a second direction.

FIGS. 5A and 5B illustrate the effect of angular adjustment of the drive roller modules 106. Notably, the conveyor belt frame 108 is not shown in FIGS. 5A and 5B for purposes of clarity in describing other components of the conveyor system 100. Beginning with FIG. 5A, the drive roller modules 106 have been pivoted in a counterclockwise direction (when the conveyor belt 102 is viewed from above) to cause counterclockwise rotation (when the conveyor belt is viewed from its end looking upstream) of the conveyor belt rollers 118, as indicated by arrow 152. Such rotation of the conveyor belt rollers 118 causes diverting action in a leftward direction in the orientation of FIG. 5A, so as to displace an article O in the direction of arrow 154. In FIG. 5B, however, the drive roller modules 106 have been pivoted in a clockwise direction (when the conveyor belt 102 is viewed from above) to cause the conveyor belt rollers 118 to rotate in a clockwise direction (when the conveyor belt 102 is viewed from its end looking upstream) indicated by arrow 155 to cause diverting action in a rightward direction and displace the article O in the direction of arrow 156.

Figure 6A:
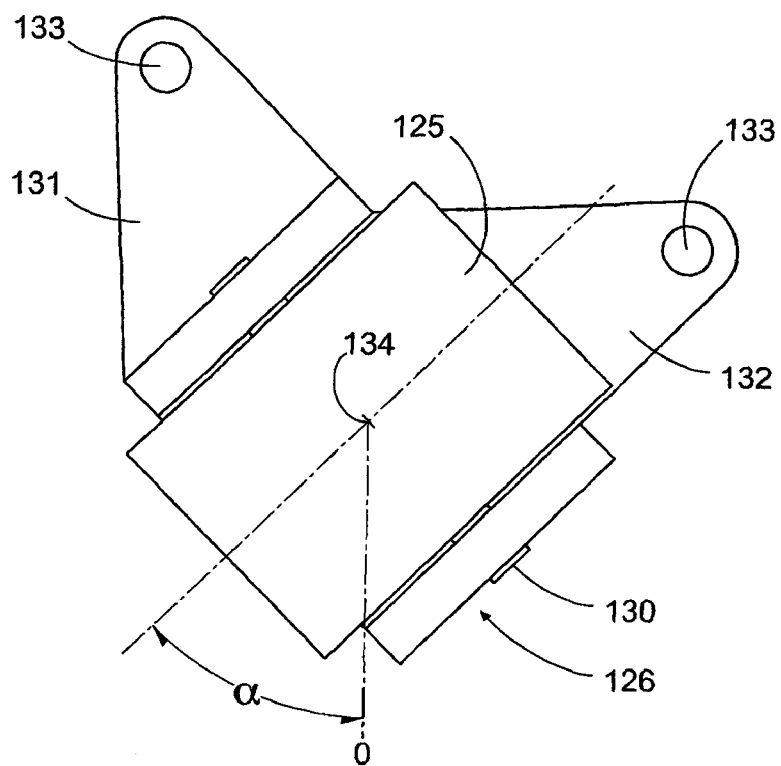
FIG. 6A is a top view of a drive roller module, illustrating pivoting of the module in a first angular direction.
Figure 6B:
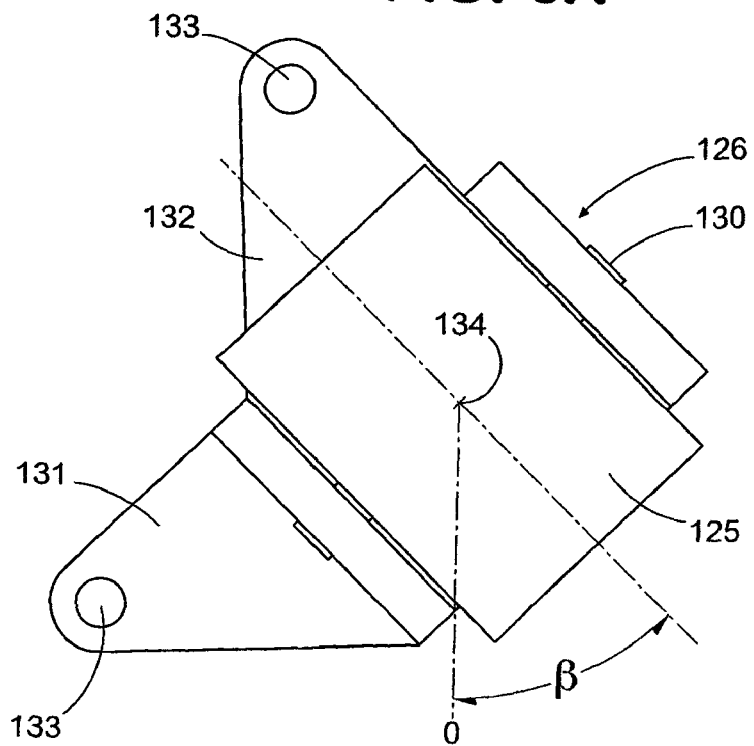
FIG. 6B is a top view of a drive roller module, illustrating pivoting of the module in a second angular direction.

FIGS. 6A and 6B illustrate the variability of diverting angles possible with the drive roller modules 106. As indicated in FIG. 6A, each drive roller module 106 can potentially be taken from a 0° orientation, in which the axis of rotation of the roller 125 is perpendicular to the direction of conveyor belt travel, to some negative angle represented by α. As indicted in FIG. 6B, the drive roller module 106 can also be taken from the 0° orientation to some positive angle represented by β. In some embodiments, both α and β can comprise any angle from 0 to 90°, thereby equating to 180° of angular variability. Although such a broad range of angular variability is possible, conveyor belt speed and limitations of the materials used for the drive rollers 125 and conveyor belt rollers 118 may limit the range of angular orientations in which roller slip can be avoided. However, angular ranges of at least approximately −70° to +70° are achievable at conveyor belt speeds of at least 100 ft/min using known high-friction surfaces. Notably, the angular displacement of the drive rollers 125 directly corresponds to the resultant diverting angle. For example, when the drive rollers 125 are oriented 35° clockwise of the 0° orientation as shown in FIG. 6A, a 35° diverting angle to the right direction results.

When the drive rollers 125 are positioned in the 0° orientation shown in FIG. 7, in which the axes of rotation of the drive rollers are perpendicular to the direction belt travel and the direction of angular rotation of the drive rollers is in line with the direction of belt travel, the conveyor belt rollers 118 are substantially prevented from rotating and are therefore "braked." Accordingly, undesired lateral movement of articles on the conveyor belt can be prevented, if desired, by controlling the drive roller modules 106, to be placed in the 0° orientation. It is further noted that when the angular orientation of the drive rollers 125 is adjusted from the 0° orientation as an initial position, the conveyor belt rollers 118 can be gradually accelerated in one direction or the other, thereby decreasing or all together preventing the roller slip that can occur when a friction plate or angled rollers suddenly engage the conveyor belt rollers. Gradual acceleration of the conveyor belt rollers 125 also enables relatively unstable articles to be diverted without tipping over. For instance, if an article to be diverted is relatively tall and has a relatively small base, the article can be gradually accelerated to one side or the other of the conveyor belt 102 by slowly increasing the angulation of the drive rollers from the 0° orientation.

Figure 8A:
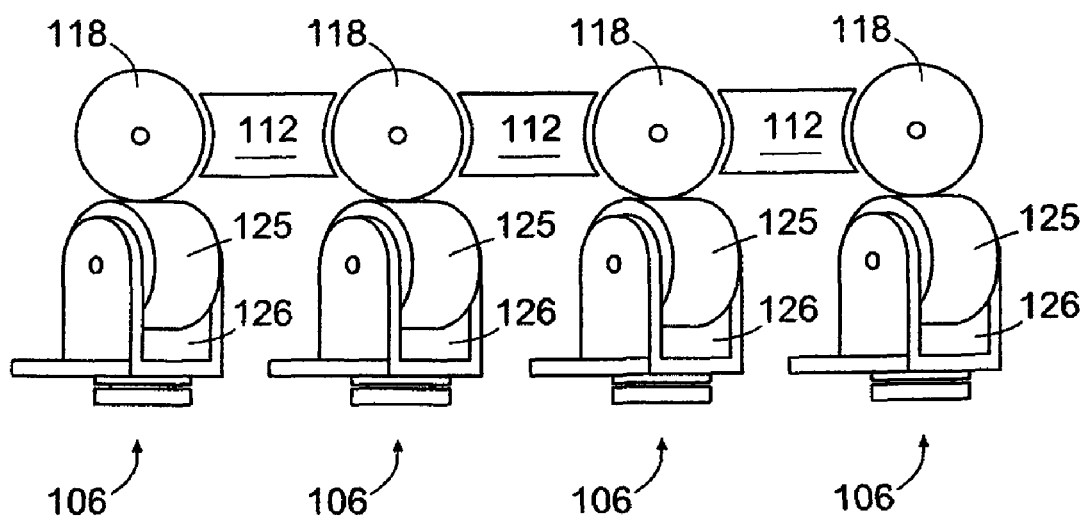
FIG. 8A is an end of a portion of the conveyor system of FIG. 1, illustrating engagement of angularly adjustable drive rollers and conveyor belt drive rollers.
Figure 8B:
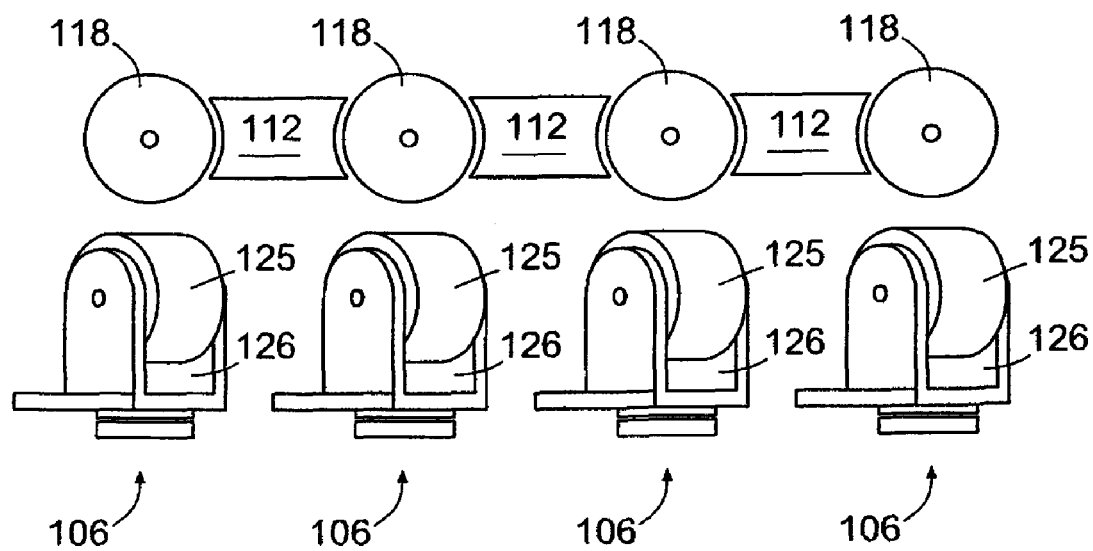
FIG. 8B is an end of a portion of the conveyor system of FIG. 1, illustrating disengagement of angularly adjustable drive rollers and conveyor belt drive rollers.

In addition to being angularly adjustable, the drive roller modules 106 can, optionally, be vertically actuated to engage or disengage the drive rollers 125 with conveyor belt rollers 118. Such functionality is depicted in FIGS. 8A and 8B. In particular, FIG. 8A illustrates the drive rollers 125 in engagement with the conveyor belt rollers 118, while FIG. 8B illustrates the drive rollers disengaged from the conveyor belt rollers. Such selective engagement and disengagement can be provided with an appropriate mechanism (not shown) that lifts the drive rollers 125 into contact with the conveyor belt rollers 118 and lowers the drive rollers out of contact with the conveyor belt rollers.

Certain advantages can be realized with such conveyor systems. For example, discrete groups of drive rollers can be operated in different zones of the conveyor system not only along the direction of travel of the conveyor belt but also along the width of the conveyor belt through the provision of discrete control mechanisms (e.g., linking members). In such cases, the positions of articles on the conveyor belt can be controlled with great precision by individually controlling the drive rollers of the different zones. In fact, when a "smart" detection and control system is provided, such as an imaging-based system, individual articles can be identified and precisely moved along and/or across the belt, for example to enable desired ordering and/or alignment of the articles on further conveyor belts on which the articles are to be placed.

Figure 9:
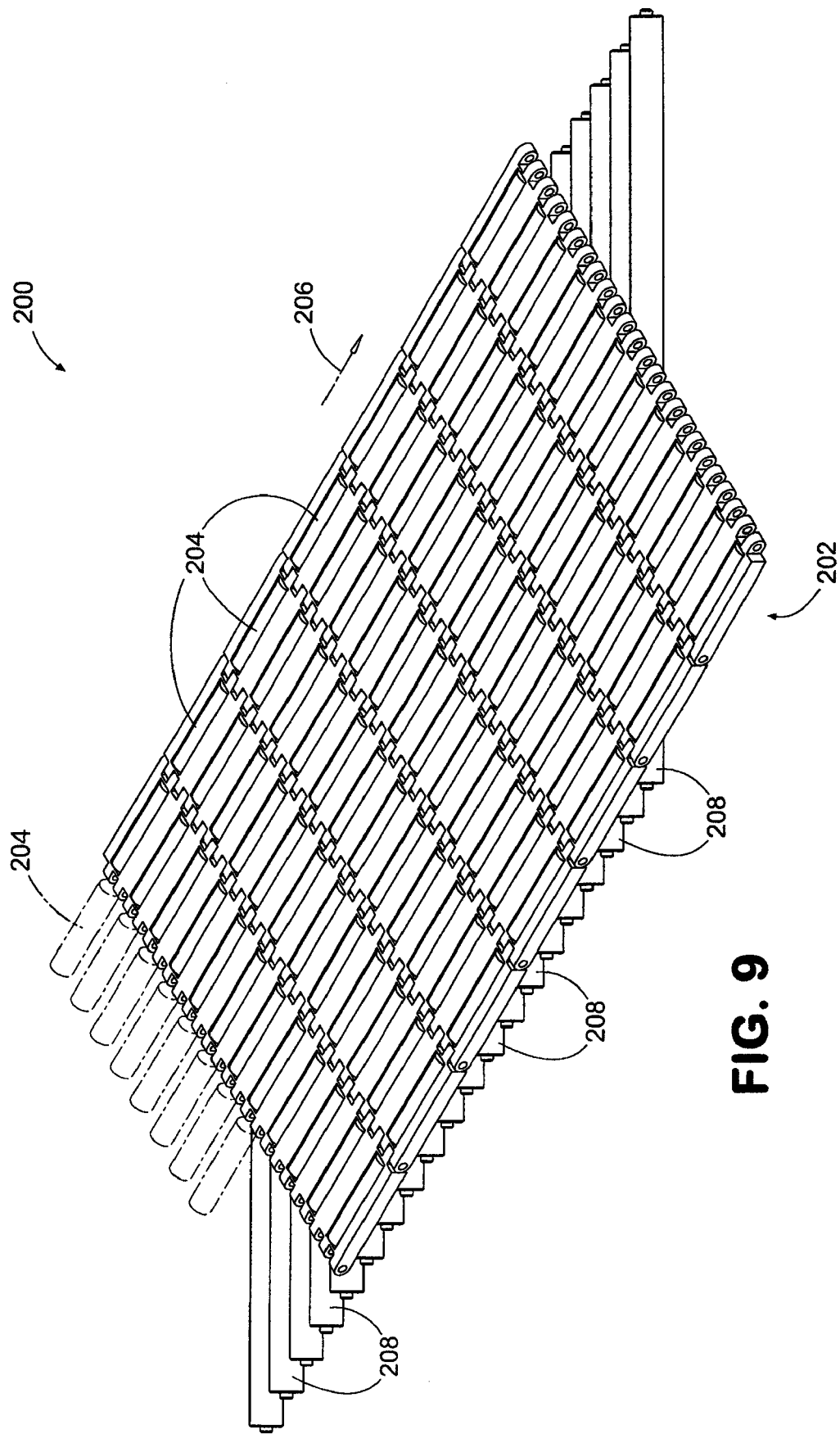
FIG. 9 is a top perspective view of a second embodiment of a portion of a conveyor system.

FIG. 9 illustrates a second embodiment of a portion of a conveyor system 200. As indicated in that figure, the conveyor system 200 is similar in several ways to the conveyor system 100 shown in FIG. 1. Therefore, the conveyor system 200 generally comprises a conveyor belt 202 that includes a plurality of longitudinally oriented free-spinning conveyor belt rollers 204. The conveyor belt 202 travels in a direction of belt travel identified by arrow 206. In addition, the system 200 comprises a plurality of free-spinning angularly adjustable drive rollers 208. In the system 200, however, the drive rollers 208 are elongated, or "longitudinal," rollers instead of caster rollers. In the embodiment shown in FIG. 9, the drive rollers 206 are longer than the conveyor belt 202 is wide.

FIGS. 10A-10C illustrate angular adjustment of the drive rollers 208 relative to the conveyor belt 202. In particular, assuming a conveyor belt direction of travel indicated by arrow 206, FIG. 10A illustrates an angulation of the drive rollers 208 that results in the diverting of articles to the left, FIG. 10B illustrates the "braking" orientation of the drive rollers, and FIG. 10C illustrates an angulation of the driver rollers that results in the diverting of articles to the right.

As with the conveyor system 100, the drive rollers 208 can be angularly adjusted using a variety of adjustment mechanisms. FIGS. 11A and 11B illustrate one such mechanism (conveyor belt not shown for purposes of clarity). As shown in those figures, the drive rollers 208 can be pivotally supported by a rectangular frame 210 comprising multiple frame members 212 that are pivotally connected to each other at pivot joints 214 located at corners of the frame. By way of example, each pivot joint 214 is formed by leaves of the frame members 212 that interleave with each other and are secured together with a pin or shaft (not shown). With such a configuration, orientation of the frame 210 can be changed from the orthogonal orientation shown in FIG. 11A, in which the frame members 212 form approximately 90° angles at each of the corners of the frame, to another orientation at which two acute angles and two obtuse angles are formed at the frame corners, as shown in FIG. 11B, thereby placing the frame into a parallelogram shape. In the orthogonal orientation of FIG. 11A, the drive rollers 208 are aligned so as to be perpendicular to the direction of belt, as indicated in FIG. 10B. Therefore, the orthogonal orientation of FIG. 11A is the braking orientation. At other orientations, however, such as that indicated in FIG. 11B, the drive rollers 208 are oriented such that they are positioned at an angle relative to the direction of belt travel to provide the diverting function.

Figure 12:
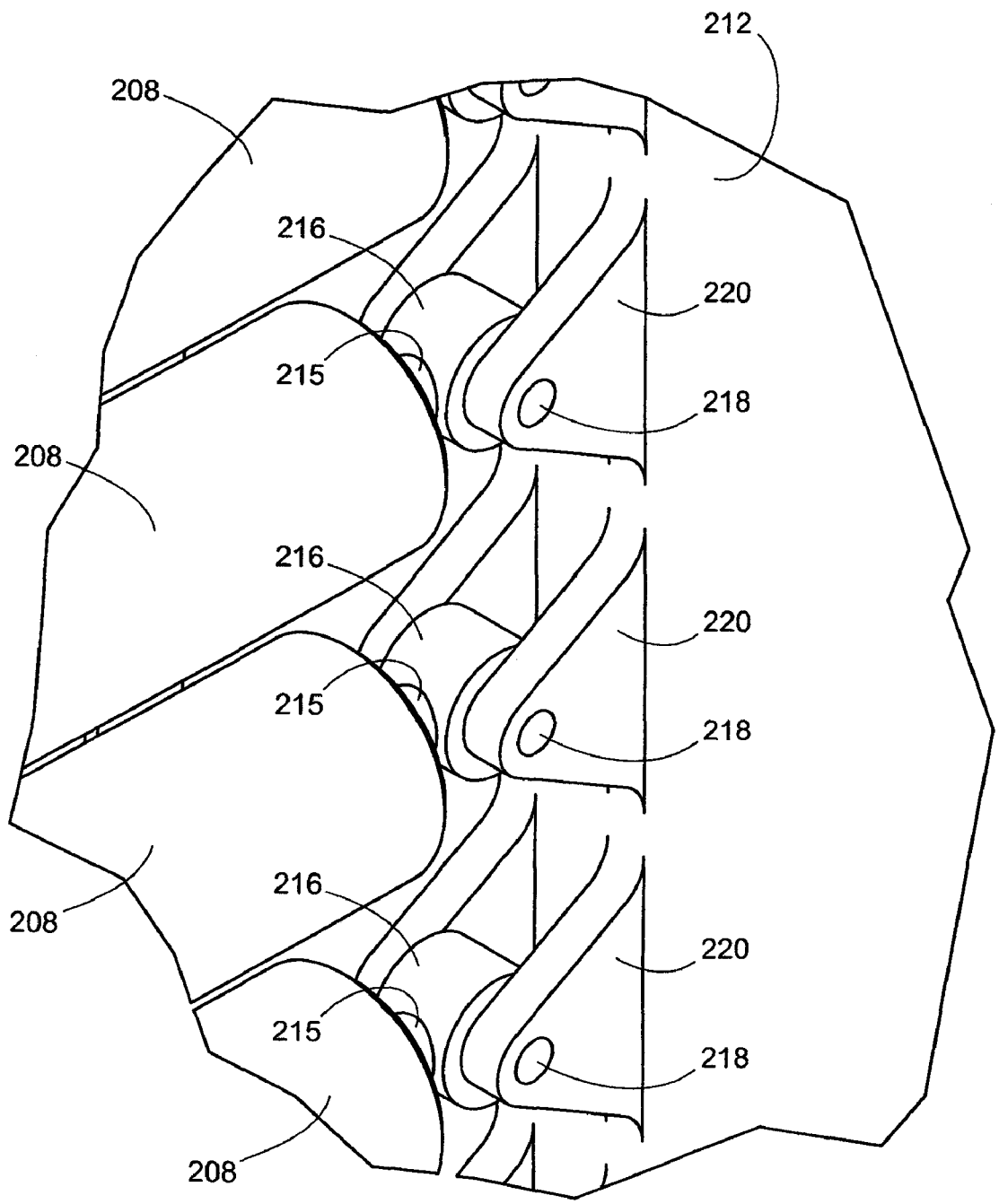
FIG. 12 is a detail view of an embodiment of joints that support ends of drive rollers in the conveyor system of FIG. 9.

Each drive roller 208 is supported at both ends by a joint that permits the change in orientation as well as free rotation. With reference to the detail view of FIG. 12, each drive roller 208 can, for example, be supported by a shaft 215 having "eye" connectors 216 configured to receive a pin 218 that extends through a support bracket 220 that is mounted to a frame member 212.

In FIGS. 11A and 11B, the frame 210 can be manipulated in the manner described above by, for example, using an actuator 222. In the embodiment shown in FIGS. 11A and 11B, the actuator 222 comprises a piston member having a piston body 224 from which a piston arm 226 can be extended, for instance under the influence of hydraulic or pneumatic pressure. Both the piston body 224 and the piston arm 226 are pivotally connected to adjacent frame members 212 with mounting brackets 228. With such an arrangement, retraction of the piston arm 226 into the piston body 224 results in angular adjustment of the drive rollers 208 in a first angular direction, while extension of the piston arm from the piston body results in angular adjustment of the drive rollers in a second, opposite angular direction. Such manipulation is evident from FIGS. 11A and 11B. In particular, FIG. 11A illustrates a first extent of extension of the piston arm 226 from the piston body 224 and a first orientation of the drive rollers 208, while FIG. 11B illustrates a second (greater) extent of extension of the piston arm from the piston body and a second orientation of the drive rollers. Through appropriate extension and retraction of the piston arm 226, the orientation of the drive rollers 208 can be precisely controlled and diverting of articles can be achieved to either side of the conveyor belt 202 at various diverting angles as depicted in FIGS. 10A-10C.

Figure 13:
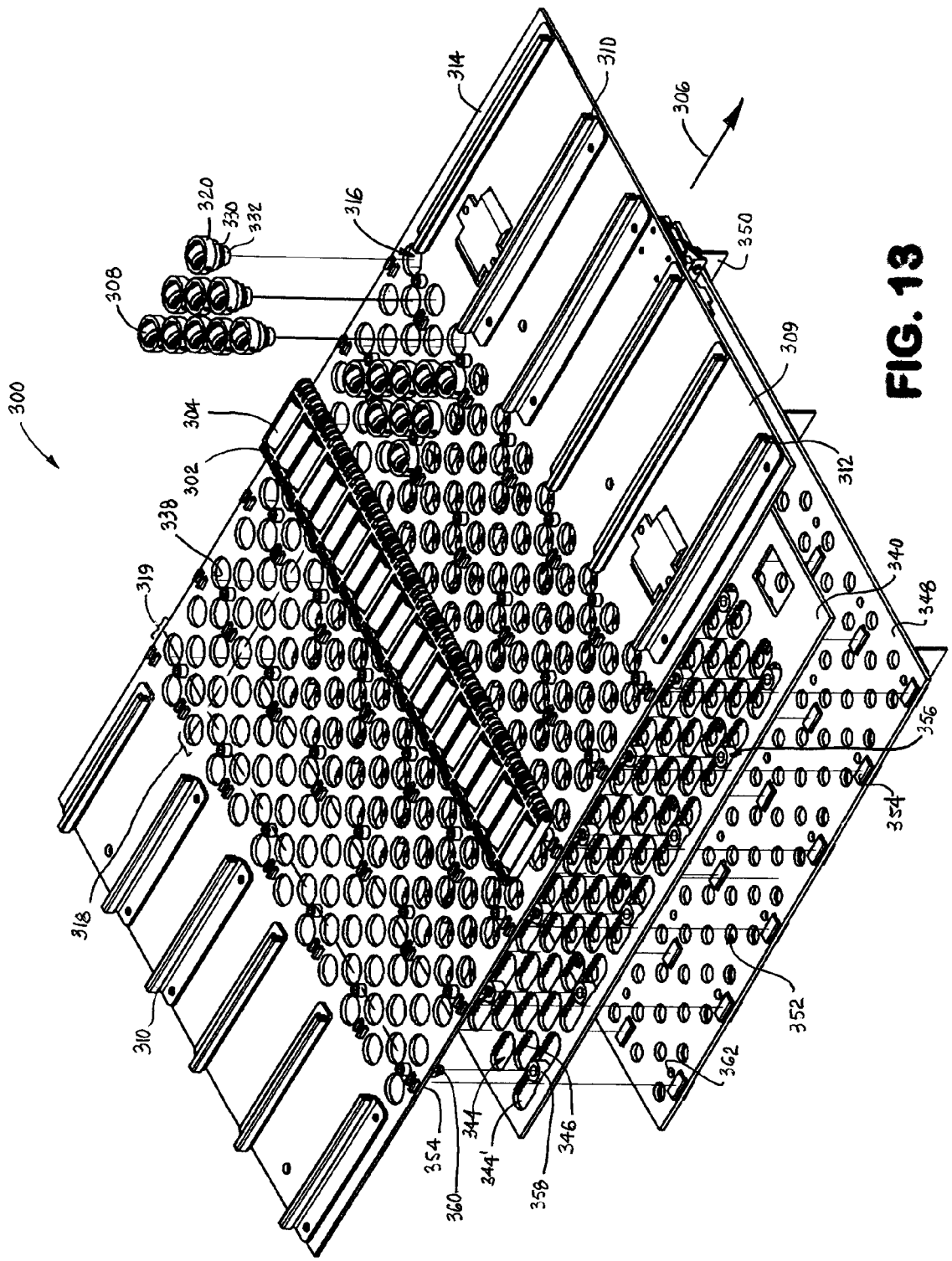
FIG. 13 is an exploded top isometric view of a third embodiment of a portion of a conveyor system with a rack-and-pinion roller drive mechanism.

An exploded view of a portion of another version of a diverting conveyor system 300 having a different roller drive mechanism is shown in FIG. 13. A conveyor belt 302 has a plurality of cylindrical rollers 304 mounted on axles (not shown) aligned longitudinally in the direction of belt travel 306. The belt is constructed of a series of rows 307 of one or more belt modules, only one row of which is shown in FIG. 13, connected side to side and end to end at hinge joints into an endless belt loop advancing along a portion of a conveyor carryway 309 in the direction of belt travel. The belt rollers are supported atop an array of drive rollers 308 along a portion of the carryway. Narrow rails 310 upstream and downstream of the drive-roller array support the belt along the remainder of the carryway. The narrow rails, topped with UHMW wear-strips 312, support the underside of the belt between adjacent rollers.

The rails are mounted on a carryway pan 314, which is itself mounted in a conveyor frame (not shown). The pan is perforated with a plurality of circular openings 316 arranged in longitudinal columns 318 and lateral rows 319. The columns of openings are laterally aligned with the lateral positions of the belt rollers. Each opening rotatably receives a cartridge 320 supporting a freely rotatable drive roller 308, which engages the belt rollers in the corresponding column as the belt advances in the direction of belt travel. The rolling contact between the belt rollers and the drive rollers causes them both to roll on each other and rotate as long as their axis are oblique to each other.

Figure 14:
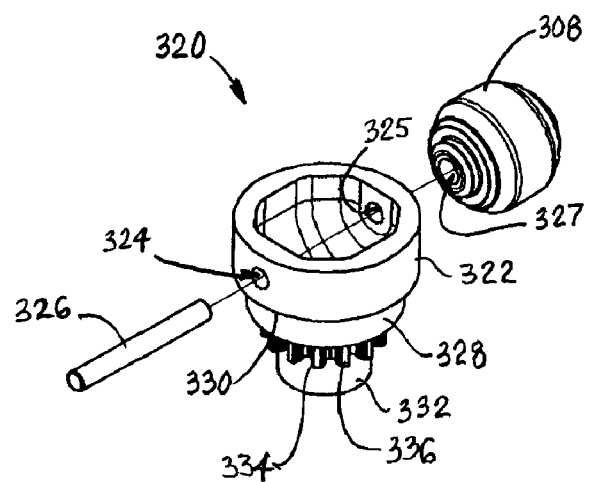
FIG. 14 is a top exploded isometric view of a drive roller cartridge of the conveyor system of FIG. 13.

As shown in FIG. 14, the drive roller cartridge 320 includes a retainer ring 322 with diametrically opposite holes 324, 325 supporting the ends of an axle 326 received in a bore 327 in the drive roller 308. One of the holes 324 can be a through hole through which the axle can be inserted into the cartridge and the drive roller, and the other hole 325 can have a blind end forming an end stop for the axle. In this way, the drive roller is retained in the cartridge along a fixed axis with a salient portion of the roller protruding beyond the top of the retainer ring. Extending downward from the retainer ring encircling the drive roller is an upper journal stem 328 having a cylindrical outer periphery indented inward from the ring, which forms a shoulder 330 between the peripheries of the ring and the stem. A lower journal stem 332 distal from the retainer ring has a smaller diameter than the upper journal stem. The periphery of the lower journal stem is indented inward of the periphery of the upper journal stem. A cartridge gear 334 is disposed between the upper stem and the lower stem. The cartridge gear is preferably a spur gear with peripheral teeth 336 whose tips do not extend past the periphery of the upper journal stem.

The cartridges 320 are received in the openings 316 in the carryway pan as shown in FIG. 13. The walls of the openings form bearing surfaces 338 against which the upper journal stems can rotate. Because the diameter of the retainer rings exceeds the diameter of the openings, the ring's shoulder 330 rests atop the carryway pan with the smaller-diameter stems and gear portions suspended below.

A gear plate 340 is movably positioned below the carryway pan. Actuator gears in the form of rack gears 342 are disposed on the gear plate. Each rack gear is positioned to engage the teeth of one of the cartridge gears to form a rack-and-pinion system that can rotate the cartridges in unison as the gear plate is translated. The gear plate has openings 344 elongated in the direction of belt travel. The elongated openings are bounded on one side by a linear array of teeth 346 forming a rack gear. Each elongated opening is positioned below one of the openings 316 in the carryway pan. The lower journal stem extends through the elongated openings in the gear plate, which is sandwiched between two other plates: the carryway pan 314 and a bottom plate 348. The bottom plate, which is stationarily affixed to a portion of the conveyor frame 350, has a plurality of openings 352 vertically aligned with, but having a smaller diameter than, the openings in the carryway pan. The openings 352 are sized to rotatably receive the lower journal stems 332 of the cartridges. This helps align the upper and lower support plates to facilitate assembly of the roller drive mechanism and also confines the rotatable cartridges in rotation on fixed vertical axes.

Confronting spacer pads 354 on the top of the bottom plate 348 and on the bottom of the top plate 314 meet to maintain the proper spacing between the two plates to accommodate the movable gear plate 340. Some of the elongated openings 344' in the gear plate are joined by intermediate slots 356. Rollers 358 in the slot portions are rotationally mounted on pins 360 extending downward from the bottom of the top plate. The distal ends of the pins are received in sockets 362 in the bottom plate. The rollers 358 bear on the sides of the slots as the gear plate is translated relative to the top and bottom plates.

Figure 15:
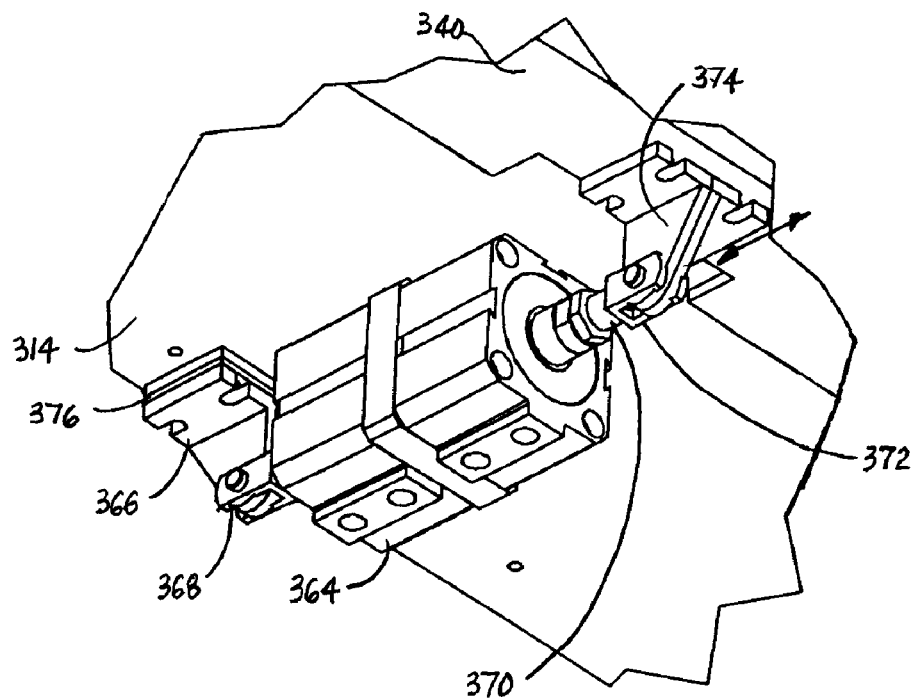
FIG. 15 is a bottom isometric view of a linear actuator in the roller drive mechanism of FIG. 13.

The gear plate is translated by a linear actuator 364, such as an air cylinder, as shown in FIG. 15. One end of the actuator is attached to a mounting bracket 366 suspended from the bottom of the top plate, or carryway pan 314, by a clevis and tie rod 368. The extension of an extension rod 370 from the other end of the actuator is selectable. The distal end of the extension rod is connected by a clevis and tie rod 372 to a pivot bracket 374 suspended from the bottom of the gear plate 340. The extension rod translates the gear plate, the rod's extension determining the position of the gear plate and the orientation of the drive rollers. Shims 376 under the mounting bracket 366 are used to account for the offset between the bottom of the carryway and the top of the gear plate.

Figure 16B:
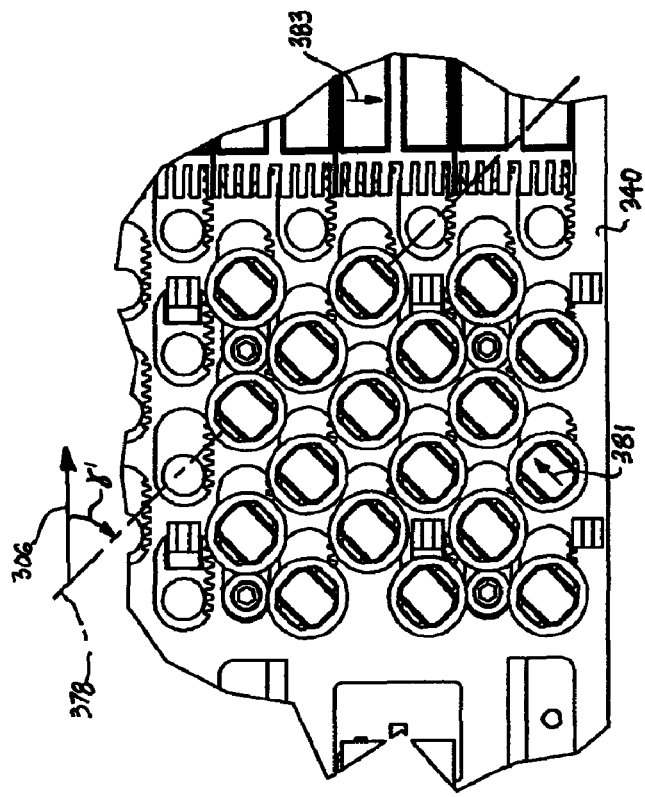
FIGS. 16A and 16B are top plan views of the drive rollers of the conveyor system of FIG. 13 shown in opposite extreme positions.
Figure 16A:
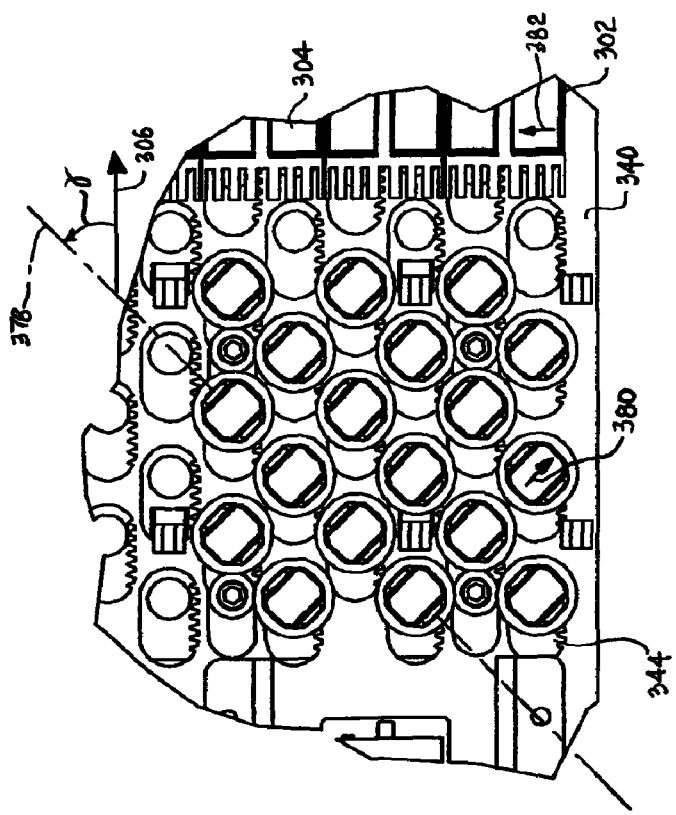

The operation of the diverting conveyor system is illustrated in FIGS. 16A and 16B. In FIG. 16A, the gear plate 340 is shown translated to one extreme position in which the drive roller cartridges 320 are positioned at the far right of the elongated slots 344. With the cartridges rotated to this position, the axes of rotation 378 of the drive rollers 308 form a counter clockwise acute angle γ measured from the direction of belt travel 306. As the conveyor belt 302 advances in the direction of belt travel, the drive rollers in this orientation rotate in the direction of arrow 380 and the engaged belt rollers in the direction of arrow 382 to direct conveyed articles towards the top of FIG. 16A. When the gear plate is translated over its range to the opposite extreme with the cartridges positioned at the far left of the elongated slots in FIG. 16B, the axes of rotation 378 of the drive rollers form a clockwise acute angle γ' measured from the direction of belt travel. In this orientation, the drive rollers rotate in the direction of arrow 381, and the belt rollers rotate in the direction of arrow 383 to push conveyed articles toward the bottom of FIG. 16B—opposite to the diverting direction of FIG. 16A.

Figure 10:
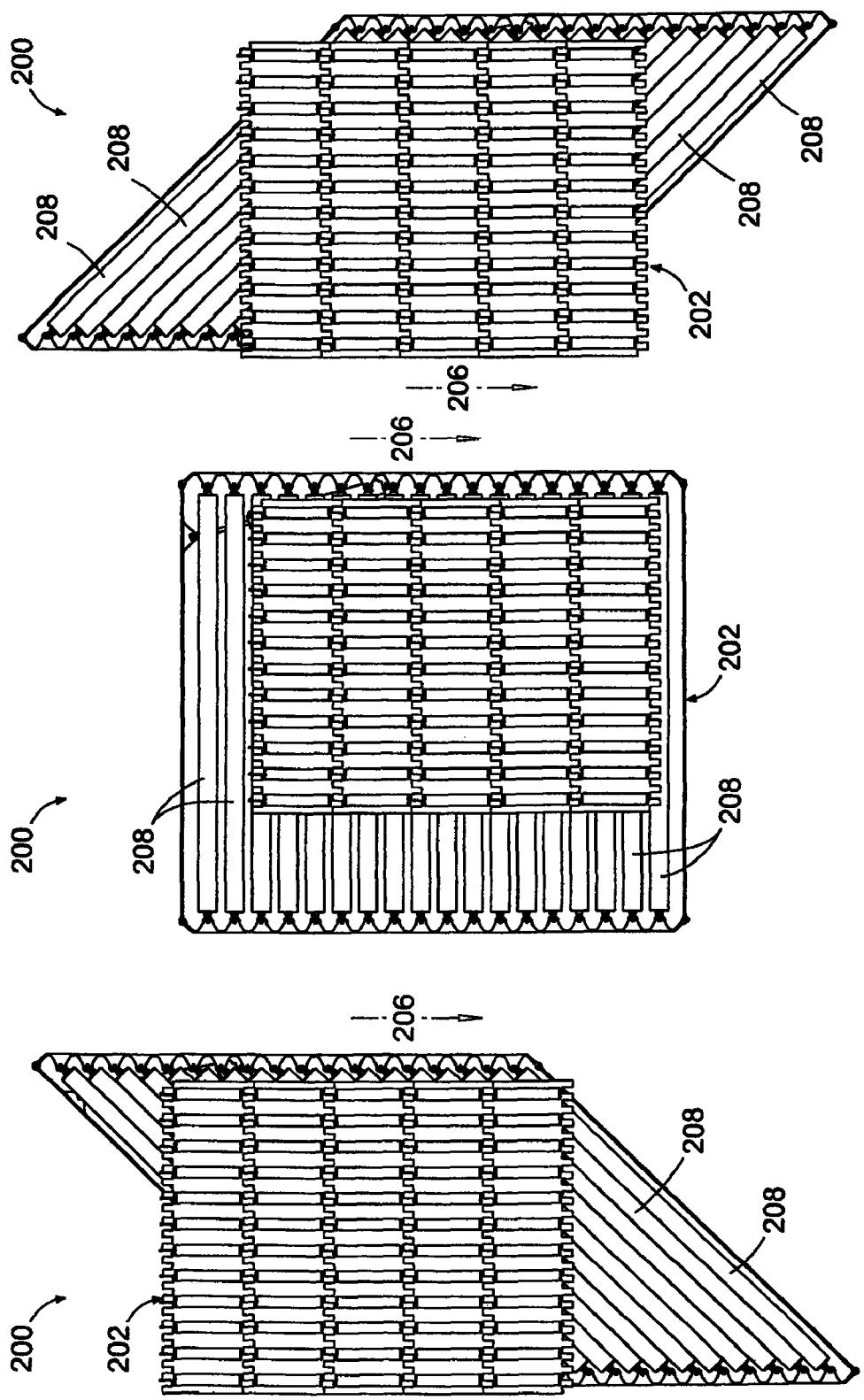
FIGS. 10A-10C are top views of the conveyor system of FIG. 9, illustrating angular adjustment of drive rollers of the system to adjust diverting angle.
Figure 11:
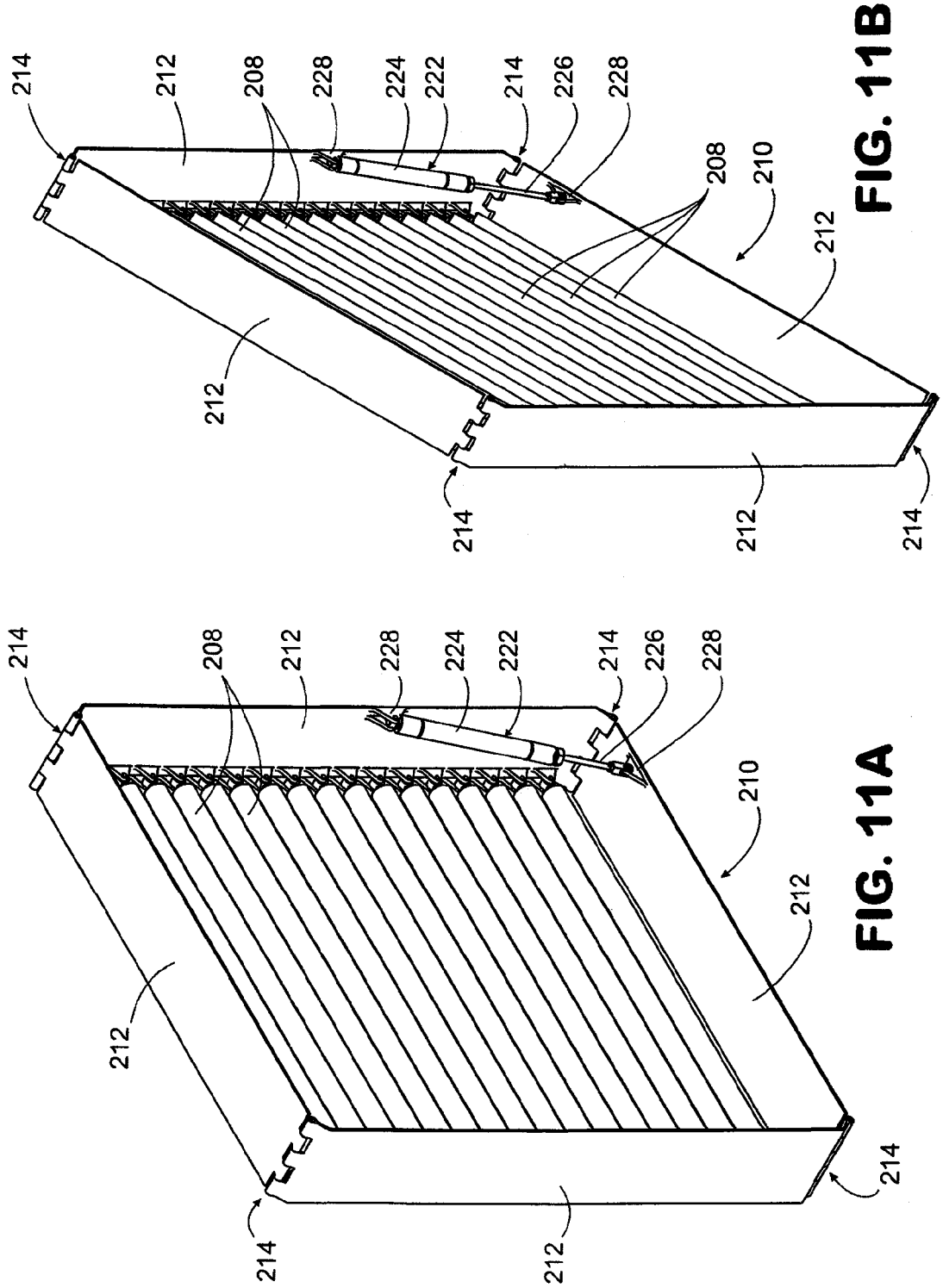
FIGS. 11A and 11B are perspective views of an embodiment of a mechanism that can be used to adjust the angulation of the drive rollers of the conveyor system of FIG. 9.
Figure 17:
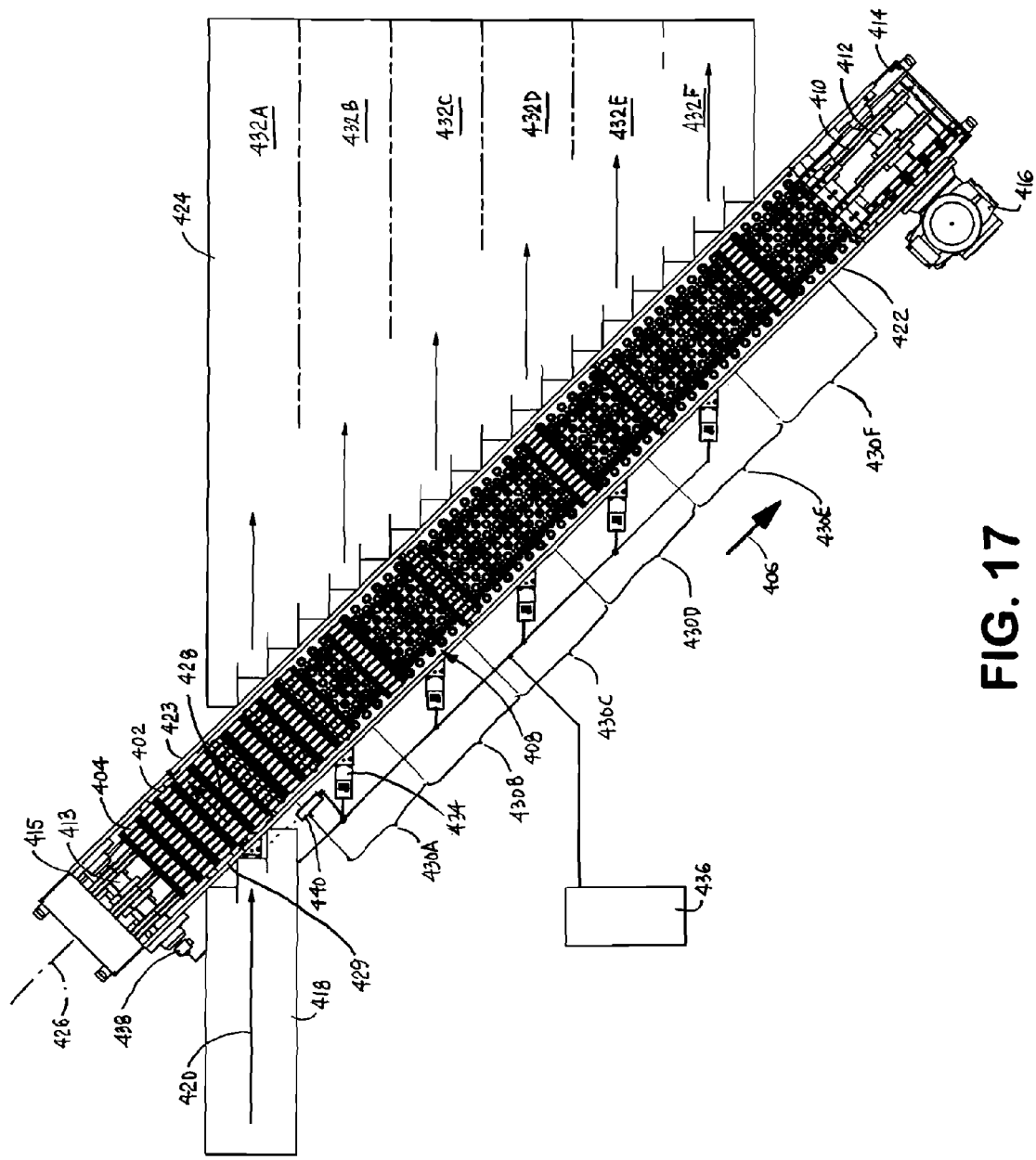
FIG. 17 is a combined schematic and top plan view, partly cut away, of a switch conveyor embodying features of the invention.

A switch conveyor can be constructed by using a 90° roller-belt with a drive mechanism, such as shown in FIGS. 4, 10, and 13, with an infeed conveyor and a multi-lane outbound conveyor, as shown in FIG. 17. The 90° roller-belt 402 is similar to the rollers belts 102, 202, and 302 previously described in that the belt rollers 404 are arranged to rotate on axes parallel to a direction of belt travel 406 by contact with drive rollers in underlying drive mechanisms 408. The roller-belt is trained around large-diameter sprockets 410 mounted on drive and idle shafts 412, 413 at downstream and upstream ends 414, 415 of the roller-belt conveyor. The drive shaft is coupled to a drive motor 416 to advance the belt in the direction of belt travel.

An infeed conveyor 418 advancing in a conveying direction 420 feeds articles onto the roller-belt conveyor over a first side 422 near the upstream end. A multiple-lane outbound conveyor 424 also advancing in the conveying direction receives articles from the roller-belt conveyor over its second side 423. The roller-belt conveyor is obliquely disposed between the infeed and outbound conveyors on a diagonal 426. An article fed from the infeed conveyor is pulled onto the roller belt by the belt rollers rotated in the transverse direction 428 by the underlying infeed drive mechanism 408 in an upstream infeed roller actuation zone 429. The rotation of the belt rollers as the belt advances and the oblique delivery of articles over the first side of the roller belt prevent the article from changing its orientation during its transfer from the infeed to the belt. The roller-belt conveyor is divided into a series of sequential outbound roller actuation zones 430A-F by separately controllable output drive mechanisms 408 underlying the belt. Each actuation zone is associated with a proximate outbound lane 432A-F. Thus, the roller-belt conveyor constitutes a sorting conveyor. As described before, the infeed actuation zone is used to pull articles onto the belt. In the infeed zone, the belt rollers may be permanently actuated or selectively actuated as in the outbound actuation zones. Actuators 434, such as motors and ball screws, for each drive mechanism are controlled by signals from a controller 436, such as a programmable-logic controller (PLC). A shaft encoder 438 mounted on one of the belt's shafts provides signals to the controller that can be used to determine when an article is nearing the actuation zone for its designated outbound lane and timing the actuation of the rollers in that zone. A position sensor 440, preferably at a known location, such as at the exit of the infeed conveyor, provides the controller with a signal indicating the entry of an article onto the roller belt and starting the timing. The shaft encoder can be replaced by other means for determining when the article later enters one of the roller actuation zones. Photo eyes, proximity switches, weight sensors, or other position sensors distributed along the length of the conveyor are examples of other equivalent means that can be used to determine an article's position on the belt at any time.

The switch operates as follows for the delivery of an article to the final outbound lane 424F under the control of the controller. The infeed conveyor feeds an article onto the roller belt whose rollers are actuated in the upstream-most zone 430A to pull the article onto the belt as indicated by the arrow 428. The drive mechanism for the outbound zones are lowered to disengage the belt rollers, as in FIG. 8, or, alternatively, the drive rollers are rotated with their axes perpendicular to the direction of belt travel, as in FIG. 7 or 10B, to brake the belt rollers. Because the article in this example is destined for the final outbound lane 424F, the prior actuation zones 424A-E are deactuated, either disengaged or braked, to keep the article on the belt as it advances in the direction of belt travel. Once the article passes all the prior zones and reaches the final actuation zone 430F, the controller, which has timed or otherwise tracked the position of the article on the belt, signals the actuator to actuate the rollers in that zone to rotate toward the second side of the belt to transfer the article over the second side and onto the selected final outbound lane 424F.

It is also possible to transfer an article over the second side of the sorting conveyor at any position along its length—not just aligned with an individual outbound lane. By coordinating the actuation of the belt rollers in one or more sequential zones with the article's position along the sorting conveyor, the switch can transfer the article off at any selected position along the length of the sorting conveyor. For example, two consecutive zones could be simultaneously actuated to transfer an article off at a selected position straddling two outbound lanes, rather than aligned with a single lane.

Thus, by using the entire diagonal roller-belt sorter, the switch wastes no valuable plant space. Furthermore, because articles are transferred on and off from the sides, instead of the ends of the roller belt, large sprockets, which improve the performance of long-pitch belts, can be used with the long-pitch roller belt.

While particular embodiments have been disclosed in detail in the foregoing description and drawings for purposes of example, it will be understood by those skilled in the art that variations and modifications thereof can be made without departing from the scope of the disclosure. In one such variation, the lower stems of the drive-roller cartridges can have hollows at their bottoms, and the openings in the bottom plate replaced by posts extending into the hollows on which the cartridges rotate. In another variation, the drive mechanisms for the switch need not be able to actuate the belt rollers in both directions. The belt rollers need to rotate in one direction only and otherwise be deactuated or braked. Thus, for braking, the unilateral drive roller arrays needed for the switch require only one-half the range of angulation of a bilateral roller array. When braking is not needed, the angle of the roller array could be fixed, and the rollers deactuated by disengaging the roller array from the belt rollers. As another example, the roller actuation zones, which are shown in FIG. 17 as rectangular in shape with its sides perpendicular and parallel to the sorting conveyor's sides and end, could be arranged on a bias relative to the sorting conveyor to allow for tighter control of the off-transfer position.

What is claimed is:

1. A switch comprising:
   an infeed conveyor conveying articles in a conveying direction;
   an outbound conveyor including a plurality of outbound conveyor lanes receiving articles and conveying the articles in the conveying direction;
   a sorting conveyor disposed on a diagonal oblique to the conveying direction between the infeed conveyor and the outbound conveyor and comprising a belt advancing along the diagonal and having rollers selectively rotatable transverse to the diagonal toward the outbound conveyor in roller actuation zones sequentially disposed along the length of the sorting conveyor to push the articles received from the infeed conveyor onto the outbound conveyor at a selected position along the sorting conveyor.

2. A switch as in claim 1 wherein the sorting conveyor comprises a roller actuation zone proximate the infeed conveyor for rotating the rollers in the belt to draw articles onto the belt from the infeed conveyor.

3. A switch as in claim 1 wherein each roller actuation zone includes an array of actuating rollers selectively movable into and out of mutually rolling contact with the rollers in the belt as the belt passes through the zone.

4. A switch as in claim 3 wherein each roller actuation zone includes an actuator coupled to the array to selectively move the array between a first position wherein the actuating rollers are oriented obliquely to the rollers in the belt for mutually rolling contact and a second position wherein the actuating rollers and the rollers in the belt are oriented perpendicular to each other in sliding contact braking the rollers in the belt.

5. A switch as in claim 1 further comprising a sensor for sensing the presence of an article at a known position on the sorting conveyor and means for determining when the article later enters one of the roller actuation zones.

6. A switch as in claim 5 wherein the means for determining comprises a shaft coupled to the roller-belt and a shaft encoder mounted on the shaft.

7. A switch as in claim 1 wherein each roller actuation zone is associated with a proximate outbound conveyor lane and is selectively actuated to push an article onto the associated outbound conveyor lane.

8. A switch comprising:
   an infeed conveyor having an exit end and conveying articles in a conveying direction toward the exit end;
   a plurality of outbound conveyor lanes having entrance ends and conveying articles in the conveying direction from the entrance ends;
   a sorting conveyor extending in length diagonally between the exit end of the infeed conveyor and the entrance ends of the outbound conveyor lanes from an upstream end to a downstream end between parallel first and second sides, wherein the infeed conveyor feeds articles to the sorting conveyor over the first side at an upstream position and the outbound lanes receive articles from the sorting conveyor over the second side at the entrance ends, the sorting conveyor including:
- a roller belt advancing along the length of the sorting conveyor in a direction of belt travel oblique to the conveying direction and having article-supporting belt rollers selectively rotatable on axes parallel to the direction of belt travel;
- a series of belt-roller actuation zones underlying the roller belt along the length of the sorting conveyor to selectively rotate the belt rollers in each zone toward the second side to push supported articles toward the outbound conveyor lanes.

9. A switch as in claim 8 further comprising an infeed belt-roller actuation zone at the upstream position rotating the belt rollers toward the second side to pull articles onto the roller belt from the exit end of the infeed conveyor.

10. A switch as in claim 8 wherein each belt roller actuation zone comprises an actuator and array of carrier rollers selectively movable by the actuator between an actuating position rollingly contacting the belt rollers passing through the zone and a non-actuating position in non-rolling contact with the belt rollers.

11. A switch as in claim 8 further comprising a sensor for sensing the presence of an article at a known position on the sorting conveyor and means for determining when the article later enters one of the belt-roller actuation zones.

12. A switch as in claim 11 wherein the means for determining comprises a shaft coupled to the roller-belt and a shaft encoder mounted on the shaft.

13. A switch as in claim 8 wherein each actuation zone is associated with a proximate one of the outbound conveyor lanes.

14. A method for making a switch, comprising:
- providing a sorting conveyor having a belt with plurality of actuatable article-supporting rollers arranged to be selectively rotated in a direction perpendicular to a direction of belt travel in roller actuation zones sequentially disposed along the length of the sorting conveyor;
- arranging an infeed conveyor to feed articles onto the sorting conveyor in a conveying direction oblique to the direction of belt travel from a first side of the sorting conveyor;
- arranging an outbound conveyor on the opposite second side of the sorting conveyor with a plurality of lanes parallel to the conveying direction, wherein the lanes are arranged to receive articles from the sorting conveyor over the second side.

* * * * *